(12) United States Patent
Deng (10) Patent No.: US 6,499,080 B1
(45) Date of Patent: Dec. 24, 2002

(54) POST WRITE BUFFER FOR A DUAL CLOCK SYSTEM

(75) Inventor: Brian T. Deng, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/478,846

(22) Filed: Jan. 7, 2000

Related U.S. Application Data (60) Provisional application No. 60/116,623, filed on Jan. 19, 1999.

(51) Int. Cl.[7] .................. G06F 13/36; G06F 13/14; G06F 13/00; G06F 1/12; G06F 1/04
(52) U.S. Cl. .................. 710/305; 710/306; 710/33; 713/400; 713/500; 713/600
(58) Field of Search .................. 710/305, 306, 710/308, 33, 61, 52, 58, 56; 713/400, 401, 500, 501, 502, 503, 600

(56) References Cited

U.S. PATENT DOCUMENTS

| | | | |
|---|---|---|---|
| 5,381,529 A | * | 1/1995 | Matsushima ............ 710/305 |
| 5,991,861 A | * | 11/1999 | Young ............ 711/202 |
| 6,377,650 B1 | * | 4/2002 | Deng et al. ............ 377/118 |

* cited by examiner

*Primary Examiner*—Peter Wong
*Assistant Examiner*—Tim Vo
(74) *Attorney, Agent, or Firm*—Mark Courtney; W. James Brady; Frederick J. Telecky, Jr.

(57) ABSTRACT

A post write buffer for a dual clock system which improves the utilization of host data bus (10) bandwidth is provided which consists of an address buffer (60), a data buffer (62), a first clock timing signal (22), a second clock timing signal (48), an address decoder (24), a first write enable circuit (72), and a second write enable circuit (74). The address-buffer (60) and data buffer (62). hold the data and the destination address for that data until the clock signals are synchronized and the data is ready for transfer. The address decoder (24) determines which destination register byte will receive the data in the host data bus (10). The write enable circuits (72, 74) synchronize the clock signals (22, 48) and determine when the destination register is ready to receive the data from the data buffer (62).

19 Claims, 6 Drawing Sheets

POST WRITE BUFFER FOR A DUAL CLOCK SYSTEM

This application claims priority under 35 USC §119 (e)(1) of Provisional Application No. 60/116,623, filed Jan. 19, 1999.

TECHNICAL FIELD OF THE INVENTION

This invention relates in general to the field of computer data bus systems, and more particularly to a post write buffer for a dual clock system.

BACKGROUND OF THE INVENTION

A computer is made up of several components which must communicate in order for the computer to perform its functions. This communication takes place across an internal bus. The internal bus is a collection of wires through which data, a destination address, and other information is transmitted from one part of a computer to another. This bus is sometimes referred to as a host data bus. The host data bus is connected to a configuration block which contains several configuration and control registers for the computer. These are referred to collectively as destination registers. One of the functions of the host data bus is to transfer data and other information into the different registers of the configuration block. Although registers in the configuration block can be up to 32 bits wide, the host data bus is often 8 or 16 bits wide. Thus, multiple transfers are necessary in order to write the necessary information to the configuration block registers.

Although it is preferable to have the host data bus and configuration block registers operate on the same clock source, thereby eliminating any clock synchronization issues, these two key components of a computer system often are attached to separate clock sources operating at different frequencies. Thus, before data and information from the host data bus can be transferred to the configuration block registers, the two clock sources must be synchronized. This requires the host data bus to wait which prevents it from performing other functions. The clock synchronization process often results in a bottleneck of data and information waiting to be transferred to different parts of the computer.

Current computer systems have a clock synchronization circuit which is invoked any time that the host data bus, clocked by a first clock source, needs to write to a configuration block register which is clocked by a second clock source. The clock synchronization circuit requires four clock cycles of the clock which controls the host data bus and three clock cycles of the clock which controls the destination register. Some of the disadvantages associated with the current solutions to the aforementioned dual clock problem are that the host data bus is unavailable to transfer data and information to other parts of the computer, and the bandwidth of the bus is wasted.

Due to the aforementioned problems, current methods of connecting a host data bus and destination registers clocked by separate clock sources are inefficient and often result in bottlenecks within the host data bus.

SUMMARY OF THE INVENTION

From the foregoing, a need has arisen for an improved system and method for transferring data from a host data bus controlled by a first clock source to a destination register controlled by a second clock source which frees the host data bus to perform other functions while a clock synchronization process occurs to allow the data to be written to the destination register. In accordance with the present invention, a post write buffer for a dual clock system is provided which substantially eliminates or reduces- disadvantages or problems associated with conventional interconnections between a host data bus and destination registers.

According to one embodiment of the present invention, there is provided a post write buffer which is coupled to both the host data bus and the configuration block and functions to buffer the data in the host data bus until registers in the configuration block are available to receive it. The post write buffer consists of an address decoder and an address buffer, a data buffer, and a write enable circuit for each of four bytes corresponding to the four bytes of the destination register in the configuration block. The post write buffer is installed in systems in which the host data bus is controlled by a first clock source and all or part of the destination registers which may reside in the configuration block are controlled by a second clock source.

The present invention provides various technical advantages over current computer system data buses. It eliminates the need for the host data bus to remain idle while waiting for the clocks to be synchronized so that data can be transferred from the host data bus to the destination register. Also, the bandwidth of the host data bus is more fully utilized since the data bus does not need to remain idle. This substantially reduces the bottleneck which often occurs in the host data bus thereby increasing the performance of the computer as a whole. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers indicate like features, and in which.

DETAILED DESCRIPTION OF THE DRAWINGS

Figure 1:
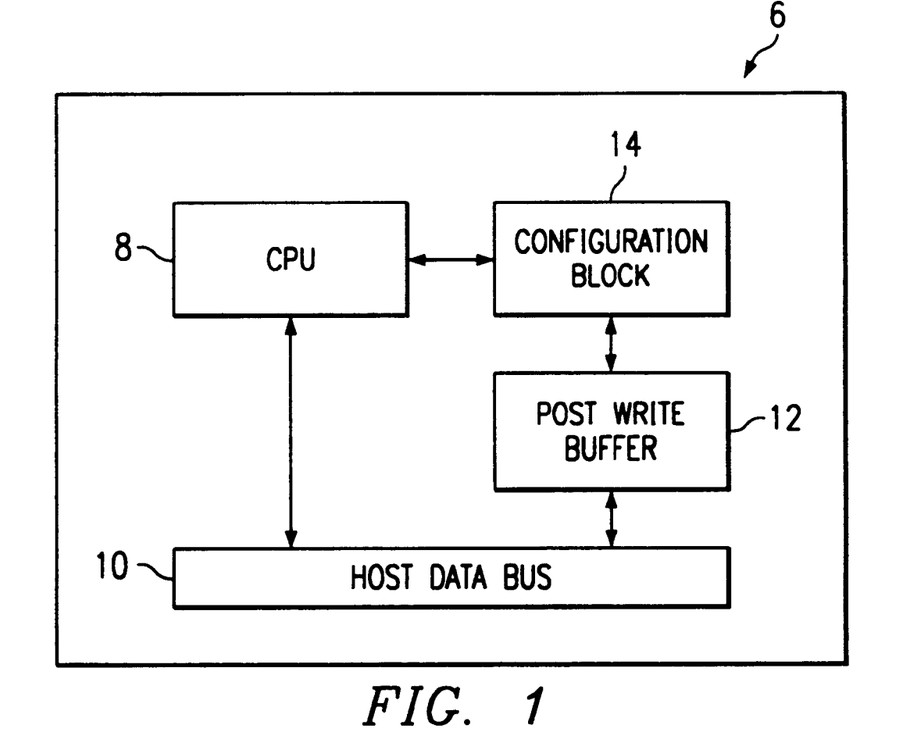
FIG. 1 is a block diagram illustrating a computer which includes a host data bus, a configuration block, and a post write buffer.

Referring to FIG. 1, a computer is generally indicated at 6. Computer 6 includes a CPU 8 which communicates with a host data bus 10. Host data bus 10 is the communications path for all communications among the several components of computer 6. Host data bus 10 is coupled to a post write buffer 12 which is itself coupled to configuration block 14. Post write buffer 12 acts as a data buffer between host data bus 10 and configuration block 14. Buffering data in post write buffer 12 enables host data 10 to proceed with other functions rather than waiting on configuration block 14 to accept the data.

Figure 2:
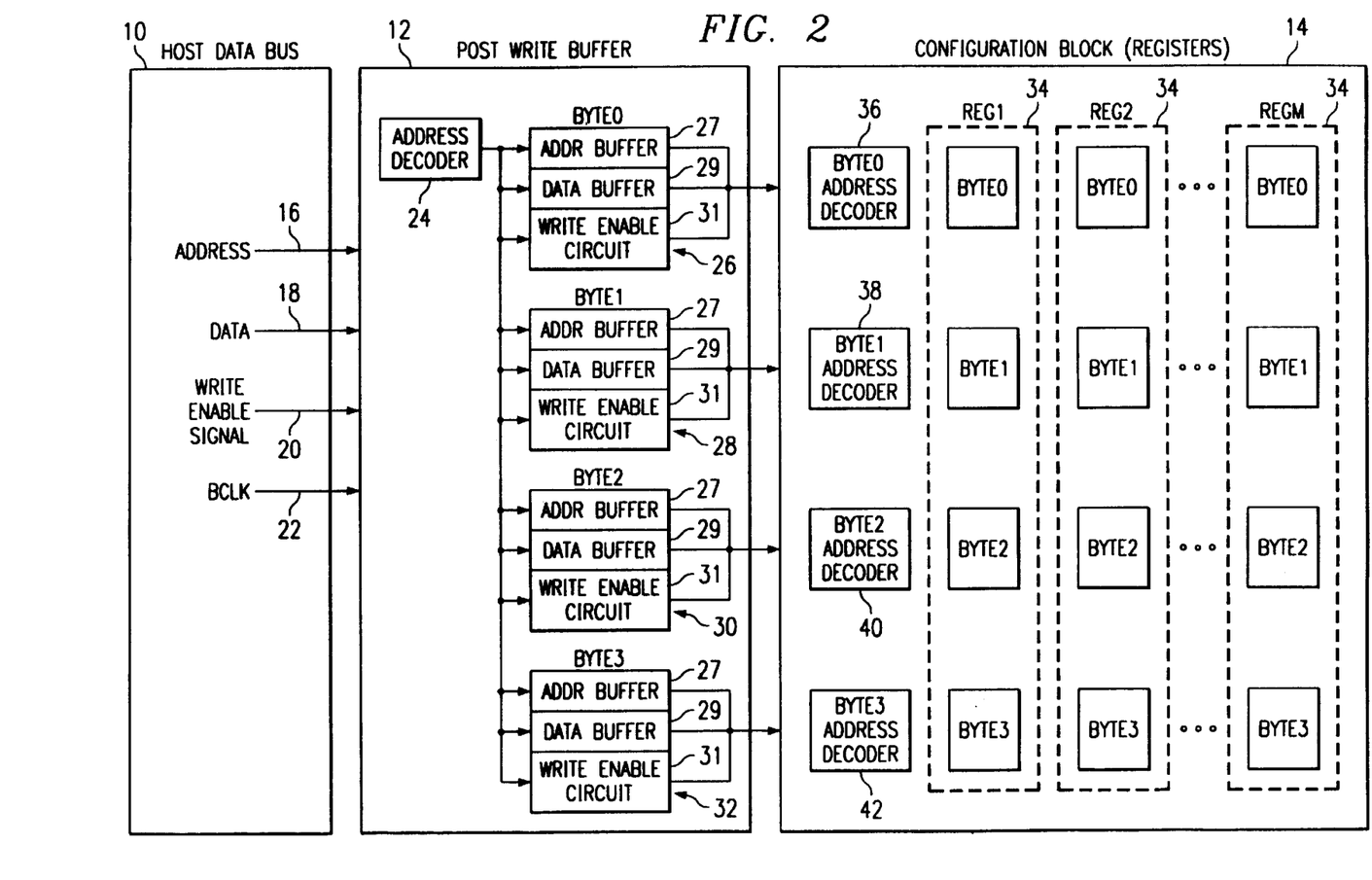
FIG. 2 is a block diagram illustrating the interconnections between a host data bus, a post write buffer and configuration block registers.

Referring to FIG. 2, host data bus 10 is coupled to post write buffer 12. Post write buffer 12 is coupled to a configuration block generally indicated at 14 and acts as an intermediary between host data bus 10 and configuration block 14. Host data bus 10 provides a communication link to transmit data and other information between the various components of computer 6.

Host data bus 10 may contain a destination address signal 16 carrying address information to indicate which register 34 in configuration block 14 is a destination for data information carried on a data signal 18. With data signal 18 preferably being eight bits or sixteen bits wide, destination address signal 16 provides the byte address for a destination register 34 which will begin receiving the data information on data signal 18. Host data bus 10 may also contain a buffer write enable signal 20 which is a logic level "0" when host data bus 10 is ready to transfer data signal 18 to post write buffer 12 and a logic level "1" when host data bus 10 is not ready to transfer data signal 18 to post write buffer 12. Host data bus 10 operates at a frequency controlled by a first clock BCLK 22. BCLK 22 is forwarded to post write buffer 12 since certain destination registers 34 in configuration block 14 can operate at a frequency controlled by BCLK 22. However, many of destination registers 34 in configuration block 14 may operate at a frequency controlled by a second clock source.

Post write buffer 12 functions as a buffer for data which is being transferred from host data bus 10 to destination register 34 in configuration block 14. Since destination registers 34 in configuration block 14 are preferably thirty-two bits wide, post write buffer 12 is designed to transfer up to thirty-two bits at one time. Since host data bus 10 is preferably eight bits or sixteen bits wide, post write buffer 12 receives several data transfers from host data bus 10 before it transfers the data to configuration block 14. Although post write buffer 12 is capable of transferring thirty-two bits at one time, there are few destination registers 34 in configuration block 14 which require all thirty-two bits to be written at the same time. Therefore, post write buffer 12 is able to transfer each byte of data as it becomes available provided the destination register 34 in configuration block 14 does not require the transfer of all thirty-two bits at the same time. An example of a destination register 34 requiring all thirty-two bits to be transferred at the same time is a cycle timer register. Other registers may require sixteen bits to be transferred at the same time. Still other registers may require that only eight bits, which is one byte, be transferred at one time.

Post write buffer 12 contains an address decoder 24 which functions to determine which clock source controls the operating frequency of destination register 34 in configuration block 14 and to determine whether destination register 34 requires all thirty-two bits of data to be transferred at the same time or if destination register 34 will accept each byte, or eight bits, of data as it becomes available. Address decoder 24 also determines if address signal 16 from host data bus 10 points to the first, second, third, or fourth byte of a destination register 34. Address decoder 24 then uses this information to determine in which of four buffer areas in post write buffer 12 to store the data and other information.

Registers in computer systems generally consist of four bytes which are labeled byte 0 through byte 3. Since post write buffer 12 is able to transfer thirty-two bits of data at the same time, it must contain buffer areas for each of the four bytes of the destination register 34. Therefore, post write buffer 12 contains a byte 0 buffer area 26, a byte 1 buffer area 28, a byte 2 buffer area 30, and a byte 3 buffer area 32. Each buffer area will function to hold and transfer data to either the first, second, third, or fourth byte of destination register 34. Each buffer area consists of three distinct sections. The first section is the address buffer 27 which contains the destination address for a byte of data. The second section is the data buffer 29 which contains the byte of data to be transferred to the destination register 34. Although data signal 18 is preferably eight bits or sixteen bits wide, data buffer 29 is preferably eight bits wide. Thus, if data signal 18 is sixteen bits wide, post write buffer 12 places the two bytes of data signal 18 in either byte 0 buffer area 26 and byte 1 buffer area 28 or byte 2 buffer area 30 and byte 3 buffer area 32 depending upon address signal 16. The third section is a write enable circuit 31 which determines when the data held in the data buffer 29 can be transferred to destination register 34. Note that there is a separate write enable circuit 31 for each buffer area within post write buffer 12 allowing each buffer area to function independently. However, if address decoder 24 determines that destination register 34 requires thirty-two bits to be written at the same time, all four buffer areas will then function together.

Configuration block 14 consists of several destination registers 34, numbered 1, 2, . . . ,M where M equal the total number of registers in configuration block 14. Each destination register 34 is preferably four bytes wide. A destination register 34 can be clocked by either BCLK 22, which also controls the operating frequency of host data bus 10, or by a second clock source. Configuration block 14 also includes: a byte 0 address decoder 36 which determines which destination register 34 will receive the data in byte 0 buffer area 26; a byte 1 address decoder 38 which determines which destination register 34 will receive the data in byte 1 buffer area 28; a byte 2 address decoder 40 which determines which destination register 34 will receive the data in byte 2 buffer area 30; and a byte 3 address decoder 42 which determines which destination register 34 will receive the data in byte 3 buffer area 32. The byte address decoders in configuration block 14 point to the associated byte number in destination register 34.

Figure 3:
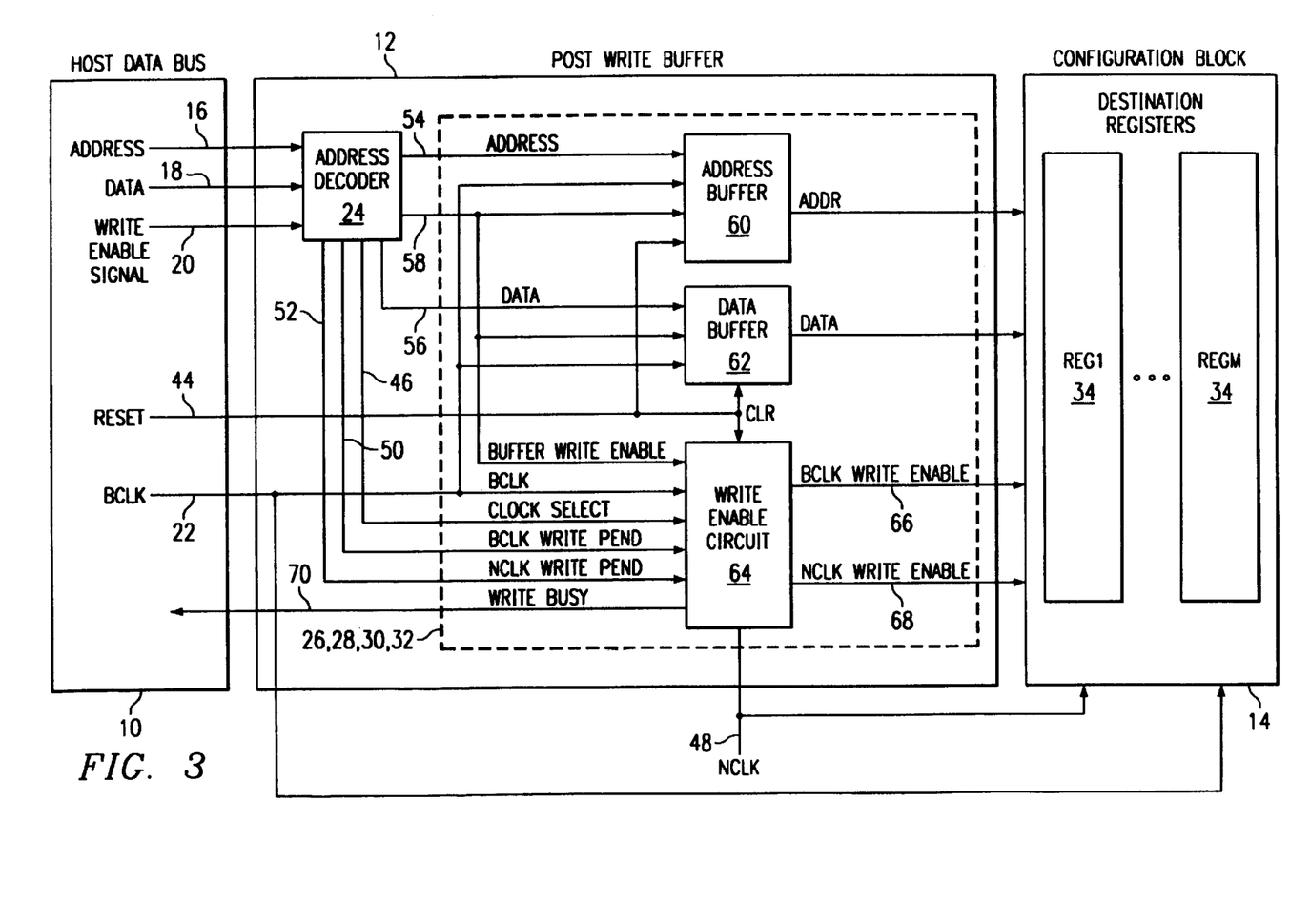
FIG. 3 is a schematic block diagram illustrating various signals and signal paths associated with the interconnections between a host data bus, a post write buffer, and a configuration block register.

FIG. 3 illustrates the signal paths within the computer data communication system shown in FIG. 1. A buffer write enable signal 20 informs post write buffer 12 that data signal 18 on host data bus 10 is ready to be transferred to the register identified by address signal 16. Host data bus 10 is clocked by BCLK 22 which also clocks certain parts of post write buffer 12. Note that BCLK 22 is also connected to configuration block 14 where it controls the operating frequency of several destination registers 34. A reset signal 44 indicates to post write buffer 12 that all elements in byte 0 buffer area 26, byte 1 buffer area 28, byte 2 buffer area 30, and byte 3 buffer area 32 should be reset to default values. Normally, reset signal 44 is set to a logic level "0", or active, at system start up time in order to clear the buffer areas. However, there may be other situations in which reset signal 44 could be set to active. Otherwise, reset signal 44 is normally set to logic level "1" which is inactive.

Post write buffer 12 includes address decoder 24 and a buffer area for each of byte 0 through byte 3 as described above. For ease of illustration, FIG. 3 shows one buffer area since the buffer area for each of the four bytes is identical.

Therefore, byte 0 buffer area 26, byte 1 buffer area 28, byte 2 buffer area 30, and byte 3 buffer area 32 are all shown by the element marked 26, 28, 30, 32. Address decoder 24 routes address signal 16, data signal 18, and write enable signal 20 to the appropriate buffer area dependent upon which byte of destination register 34 to which address signal 16 refers. Specifically, address decoder 24 routes address signal 16 to a destination address 54, data 18 to a data signal 56, and write enable signal 20 to a buffer write enable signal 58 dependent upon which byte of destination register 34 to which address signal 16 points. BCLK 22 and reset signal 44 are directly connected to each of the four buffer areas.

Address decoder 24 determines which clock source controls the operating frequency of destination register 34 and sets a clock select signal 46 to a logic level "1" in response to destination register 34 being clocked by BCLK 22. If destination register 34 is clocked by a second clock NCLK 48, clock select signal 46 is set to a logic level "0". After address decoder 24 determines which clock source is connected to destination register 34, it determines the number of bytes which must be available before post write buffer 12 can transfer data to destination register 34. If destination register 34 is clocked by BCLK 22 and requires multiple bytes to be available before post write buffer 12 can transfer data to destination register 34, address decoder 24 sets BCLK write pending 50 to a logical level "1" in order to prevent data in a data buffer area from being transferred to destination register 34. When all necessary bytes are available in the buffer areas, a BCLK write pending 50 signal for all required bytes is set to a logic level "0" which allows a data transfer to occur at the next leading edge of BCLK 22. The same process occurs if destination register 34 is clocked by NCLK 48 except that address decoder 24 sets NCLK write pending signal 52 to the appropriate value.

An address buffer 60 receives signals from address decoder 24 including destination address 54, BCLK 22 signal and buffer write enable signal 58. Address buffer 60 holds the destination address indicated by address signal 16 until the associated data which will be held in a data buffer 62 is ready to be transferred to destination register 34.

Data buffer 62 holds data from data signal 18 until it is ready to be transferred to destination register 34. Data buffer 62 receives input signals from address decoder 24 including data 56 and buffer write enable signal 58. Data buffer 62 also receives BCLK 22 signal.

A write enable circuit 64 determines when data 56 can be written to the register indicated by destination address 54. Write enable circuit 64 receives the following input signals: buffer write enable signal 58; BCLK 22 signal; clock select signal 46; BCLK write pending signal 50; NCLK 48 signal; and NCLK write pending signal 52. Write enable circuit 64 processes these signals and can generate a BCLK write enable signal 66 of logic level "0", or active, when clock select signal 46 indicates that destination register 34 is clocked by BCLK 22. Write enable circuit 64 can generate an NCLK write enable signal 68 of logic level "0", or active, when clock select signal 46 indicates that destination register 34 is clocked by NCLK 48. Finally, write enable circuit 64 can generate a write busy signal 70 which is a logic level "1" to indicate that the buffer area has received information but has not yet transferred that information to a destination register 34. Write busy signal 70 is a status signal and can be used by host data bus 10 to determine when to set write enable signal 20 to a logic level "0" indicating that the information in host data bus 10 can be transferred to post write buffer 12.

Figure 4:
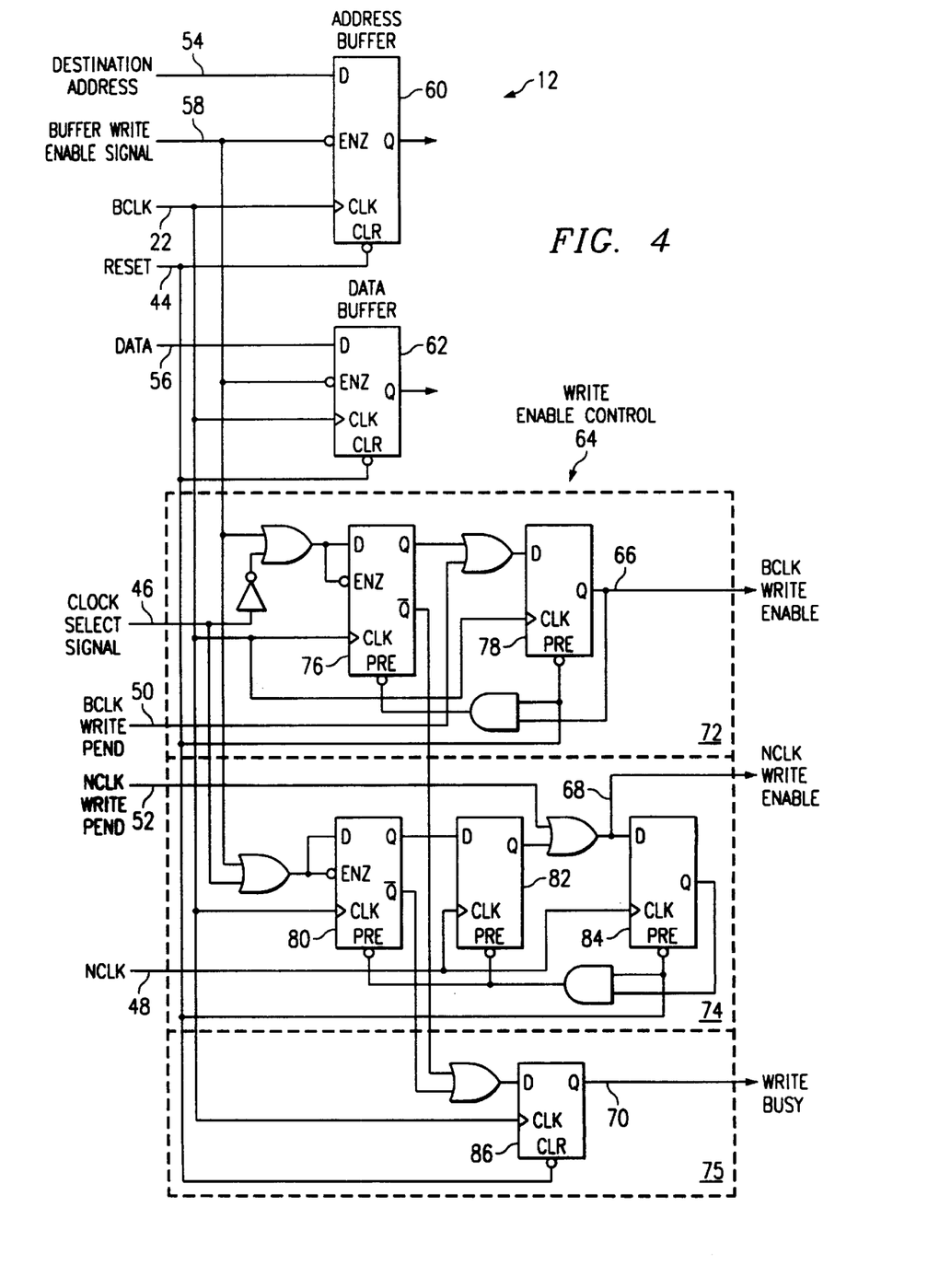
FIG. 4 is a schematic diagram of a single byte buffer area in a post write buffer which consists of four buffer areas corresponding to the four bytes of a destination register in a configuration block.

FIG. 4 is a block schematic diagram illustrating a single buffer area within post write buffer 12. This buffer area could represent byte 0 buffer area 26, byte 1 buffer area 28, byte 2 buffer area 30, or byte 3 buffer area 32. Address buffer 60 consists of a D-type flip-flop with an enable input. The enable signal causes the D-type flip-flop of address buffer 60 to ignore the clock signal until buffer-write enable signal 58 is a logic level "0". Thus, address buffer 60 does not change states until buffer write enable signal 58 is a logic level "0". Address buffer 60 functions to hold destination address 54 until write enable circuit 64 determines that data 56, which is held in data buffer 62, can be transferred to destination register 34.

Data buffer 62 consists of a D-type flip-flop with an enable input. The enable input of data buffer 62 operates in the same manner as that of address buffer 60. Data buffer 62 holds data 56 until write enable circuit 64 determines that data 56 can be transferred to destination register 34. Write enable circuit 64 determines this by processing its inputs and generating either a BCLK write enable signal 66 or an NCLK write enable signal 68 dependent upon which clock source determines the operating frequency of destination register 34 as indicated by clock select signal 46.

Write enable circuit 64 can be logically divided into three parts. First is a BCLK write enable circuit 72. Second is an NCLK write enable circuit 74, and third, is a write busy circuit 75. Write busy circuit 75 receives BCLK 22 signal and a signal from each of BCLK write enable circuit 72 and NCLK write enable circuit 74. Clock select signal 46 is shared between the first two parts of write enable circuit 64 since clock select signal 46 determines whether BCLK write enable signal 66 or NCLK write enable signal 68 needs to be generated.

BCLK write enable circuit 72 consists of two D-type flip-flops, a flip-flop 76 and a flip-flop 78, both being clocked by BCLK 22. Flip-flop 76 contains an enable input which functions in the same way as the enable inputs on address buffer 60 and data buffer 62. For post write buffer 12 of the present invention, all write enable signals are preferably active when they are set to a logic level "0" and preferably inactive when set to a logic level "1". An active write enable signal allows data to be transferred from one point to another. An inactive write enable signal will hold the data transfer until the next leading edge of the appropriate clock when the write enable signal is active.

If clock select signal 46 is a logic level "1", indicating that destination register 34 is clocked by BCLK 22, and buffer write enable signal 58 is a logic level "0", flip-flop 76 is enabled and makes the Q output of flip-flop 76 a logic level "0". If clock select signal 46 is a logic level "0" or buffer write enable signal 58 is a logic level "1", flip-flop 76 is not enabled and no change of state occurs. The Q output of flipflop 76 is coupled with an OR logic gate which is coupled to the D input of flip-flop 78. Flip-flop 78 does not have an enable input as does flip-flop 76. Thus, flip-flop 78 can change state with each leading edge of BCLK 22 signal. If the Q output of flip-flop 76 is a logic level "0" and BCLK write pending 50 is a logic level "0", flip-flop 78 makes its Q output a logic level "0" which causes BCLK write enable signal 66 to be a logic level "0" which is active. If the Q output of flip-flop 76 is a logic level "1" or BCLK write pending 50 is a logic level "1", flip-flop 78 generates a logic level "1" on its Q output which causes BCLK write enable signal 66 to be a logic level "1" which is inactive.

The preset input of flip-flop 78 is coupled with reset signal 44 which causes the Q output of flip-flop 78 to be initialized to a logic level "1" whenever reset signal 44 is a logic level "0". If BCLK write enable signal 66 is a logic level "0"

which is active or reset signal 44 is a logic level "0" which is active, a logic level "0" is forwarded to the preset input of flip-flop 76 thus presetting the Q output of flip-flop 76 to a logic level "1". In other words, as soon as BCLK write enable signal 66 is set to active, flip-flop 76 is reset to generate an inactive write enable signal until the circuit determines that it is necessary to generate the next active write enable signal.

NCLK write enable circuit 74 consists of three flip-flops, a flip-flop 80, a flip-flop 82, and a flip-flop 84. Flip-flop 80 contains an enable input which operates in the same manner as the enable input on address buffer 60, data buffer 62, and flip-flop 76. Flip-flop 80 is clocked by BCLK 22, and flip-flop 82 and flip-flop 84 are clocked by NCLK 48. If buffer write enable signal 58 is a logic level "0" and clock select signal 46 is a logic level "0", flip-flop 80 will change state and generate a logic level "0" on its Q output. Otherwise, flip-flop 80 will remain in its default state which includes a Q output of logic level "1".

Flip-flop 80 indicates to NCLK write enable circuit 74 that destination register 34 is clocked by NCLK 48 and that BCLK 22 and NCLK 48 should be synchronized before the data in data buffer 62 can be transferred to destination register 34. The Q output of flip-flop 80 is coupled to flip-flop 82 which does not contain an enable input. Thus, it may change states with each leading edge of NCLK 48. Flip-flop 80 and flip-flop 82 comprise the clock synchronization function of the present invention. Once the Q output of flip-flop 80 is a logiclevel "0", flip-flop 82 will generate on its Q output a logic level "0" on the next leading edge of NCLK 48. The Q output of flip-flop 82 is coupled to an OR logic gate which directly generates NCLK write enable signal 68. If both the Q output of flip-flop 82 and NCLK write pending signal 52 are a logic level "0", NCLK write enable signal 68 is a logic level "0" which indicates an active state. If either the Q output of flip-flop 82 or NCLK write pending 52 is a logic level "1", then NCLK write enable signal 68 is a logic level "1" which indicates an inactive state.

The third flip-flop, flip-flop 84, generates a feedback signal to preset flip-flops 80 and 82 to their default state. If the Q output of flip-flop 84 is a logic level "0", which it will be on the next leading edge of NCLK 48 after NCLK write enable signal 68 is set to a logic level "0", or reset signal 44 is a logic level "0" which indicates an active status, the preset input of flip-flop 80 and the preset input of flip-flop 82 are both a logic level "0" which causes the Q output of each flip-flop to be preset to a logic level "1". Note that a logic level "1" indicates that the write enable signals are inactive. The third flip-flop 84 introduces a one NCLK cycle delay before flip-flop 80 and flip-flop .82 are preset. This presets NCLK write enable circuit 74 after data is transferred from data buffer 62 to a destination register which is clocked by NCLK 48 signal. This prevents NCLK write enable signal 68 from being a logic level "0" when there is no data in data buffer 62 to be transferred.

Write busy circuit 75 consists of one flip-flop, flip-flop 86, which is clocked by BCLK 22. If flip-flop 76 or flip-flop 80 indicate that data buffer 62 contains data waiting to be transferred to a destination register 34, flip-flop 86 generates a Q output of logic level "1" which makes write busy signal 70 a logic level "1" indicating that no data can be transferred into data buffer 62 without overlaying the data waiting to be transferred. When write busy signal 70 is a logic level "0", then no data is present in data buffer 62 which is awaiting transfer to a destination register 34. Therefore, any data can be transferred into data buffer 62 without overlaying viable data.

Figure 5:
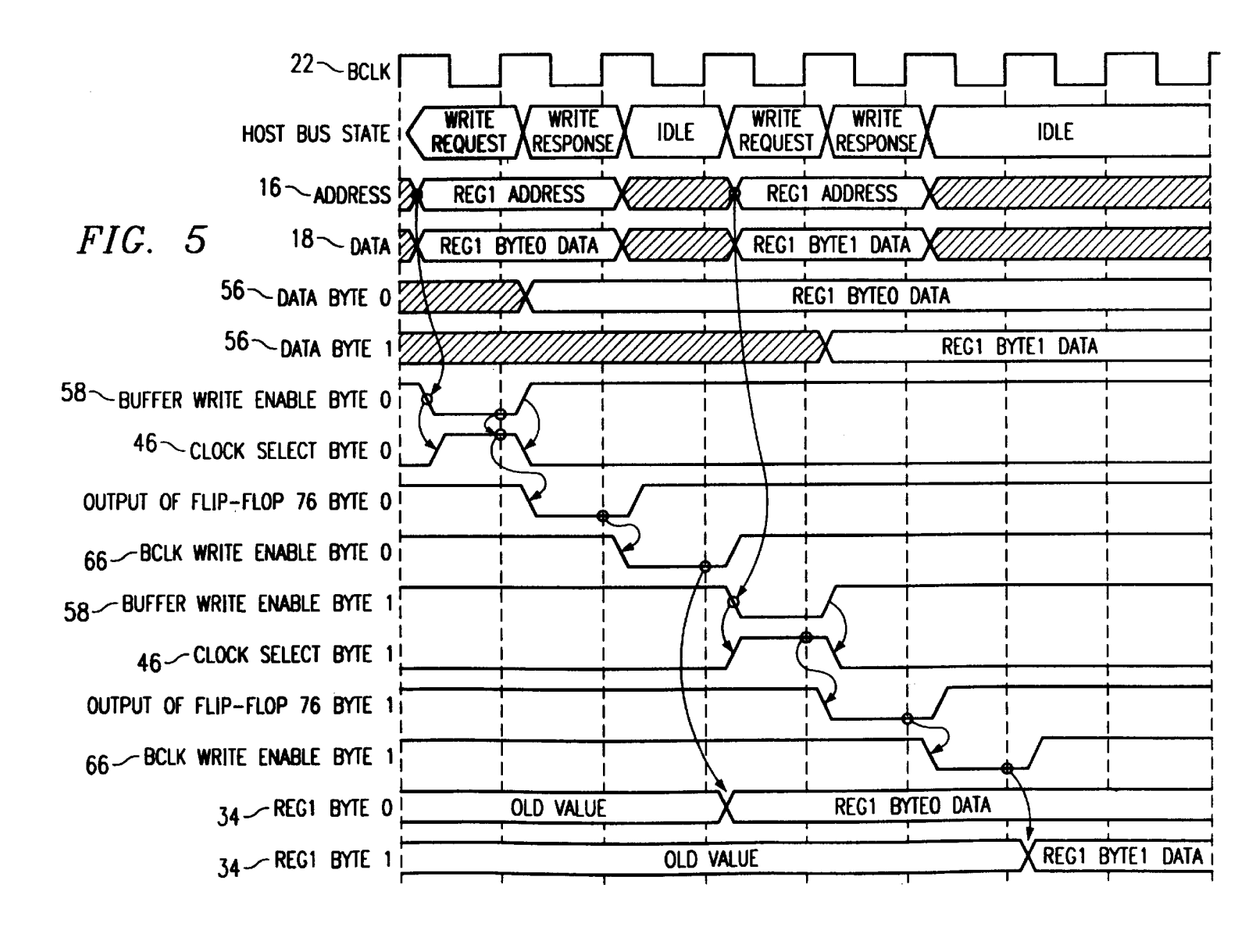
FIG. 5 is a timing diagram illustrating the functions when both the post data bus and destination register are clocked by the same clock source.

FIG. 5 illustrates a sample timing diagram for the present invention where host data bus 10 is eight bits wide and destination register 34 in configuration block 14 is clocked by the same clock source as host data bus 10, BCLK 22. The timing diagram represents the processing of post write buffer 12 as it transfers byte 0 and byte 1 from host data bus 10 to the first two bytes of a destination register 1 in configuration block 14. Note that it takes three leading edges of BCLK 22 after host data bus 10 makes a write request for data in data signal 18 to be transferred to the appropriate destination register 34 byte.

Figure 6:
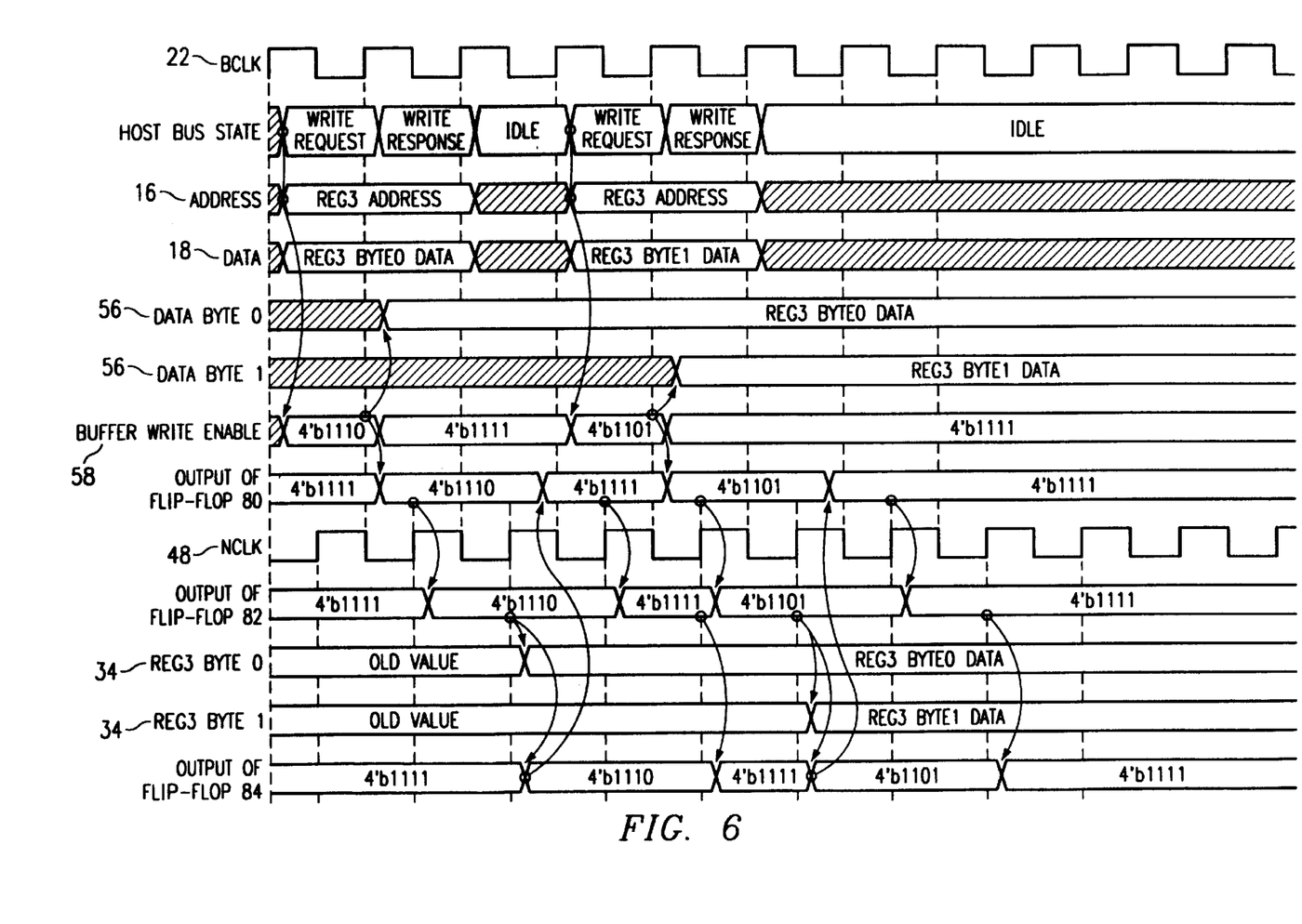
FIG. 6 is a timing diagram illustrating the functions when the host data bus and destination register are clocked by separate clock sources.

FIG. 6 illustrates a sample timing diagram for the present invention where host data bus 10 is eight bits wide and clocked by BCLK 22 and destination register 34 is clocked by NCLK 48. The timing diagram illustrates the transfer of byte 0 and byte 1 from host data bus 10 to the appropriate bytes of destination register 34. Note that the write enable signals are given for each of the four buffer areas corresponding to byte 0 buffer area 26, byte 1 buffer area 28, byte 2 buffer area 30, and byte 3 buffer area 32. After host data bus 10 makes a write request, the process of transferring a byte of data from host data bus 10 to the appropriate byte of destination register 34 takes two leading edges of BCLK 22 and three leading edges of NCLK 48.

According to the teachings of the present invention, a post write buffer for systems which have a host data bus clocked by a first clock source and configuration block registers clocked by a second clock source is provided that handles the transfer of data to the configuration block register while freeing the host data bus to perform other tasks. The advantages of utilizing a post write buffer include eliminating the need for the host data bus to be idle while a clock synchronization procedure occurs and freeing the host data bus to perform other tasks while data is being transferred to the configuration block registers.

Thus, it is apparent that there has been provided in accordance with the present invention, an improved system and method for transferring data from a host data bus to a configuration block register utilizing a post write buffer that satisfies the advantages set forth above. Although the present invention and its advantages have been described in detail, it should be understood that various changes, substitutions, and alterations readily apparent to those skilled in the art may be made herein without departing from the spirit and the scope of the present invention as defined by the following claims.

What is claimed is:

1. A post write buffer for a dual clock system, comprising:
   an address buffer operable to receive a destination register address for data on a host data bus;
   a data buffer operable to receive data from the host data bus and thereby releasing the host data bus for other functions, the data buffer operable to provide data to a particular one of a plurality of destination registers in response to the destination register address;
   wherein the address buffer, data buffer, and some of the plurality of destination registers are controlled by a first clock timing signal;
   wherein others of the plurality of destination registers are controlled by a second clock timing signal;
   an address decoder operable to determine which of the first and second clock timing signals controls the particular one of the plurality of destination registers, the address decoder operable to determine a number of data bytes which must be available before data can be transferred to the particular one of the plurality of destination registers;

a first write enable circuit operable to generate write-enable signals for destination registers controlled by the first clock timing signal; and a second write enable circuit operable to generate write-enable signals for destination registers controlled by the second clock timing signal.

2. The system of claim 1, wherein the address decoder is operable to generate a first write pending signal in response to determining that the particular one of the plurality of destination registers is controlled by the first clock timing signal and requires more than one byte of data to be transferred at one time.

3. The system of claim 1, wherein the address decoder is operable to generate a second write pending signal in response to determining that the particular one of the plurality of destination registers is controlled by the second clock timing signal and requires more than one byte of data to be transferred at one time.

4. The system of claim 1, wherein the address decoder is operable to generate a clock select signal in response to determining which of the first and second clock timing signals control the operating frequency of the particular one of the plurality of destination registers, the clock select signal indicating which of the first and second write-enable circuits to invoke.

5. The system of claim 1, wherein the address decoder is operable to forward the destination register address to the address buffer.

6. The system of claim 1, wherein the address decoder is operable to forward the data from the host data bus to the data buffer.

7. The system of claim 1, wherein the address decoder is operable to:

receive a buffer write enable signal from the host data bus; and forward the buffer write enable signal to the address buffer, data buffer, first write enable circuit, and second write enable circuit, the buffer write enable signal initiating a data transfer from the host data bus to the destination register.

8. The system of claim 1, further comprising a reset signal for resetting the post write buffer circuit elements to default values.

9. The system of claim 1, wherein the first and second write enable circuits are further operable to generate a write busy status signal indicating that data in the data buffer has not been written to the destination register.

10. The system of claim 1, wherein the host data bus has a capacity of either 8 bits or 16 bits.

11. The system of claim 1, wherein the data buffer has a capacity of 8 bits.

12. A computer system consisting of several component parts, each component part controlled by one of two clock timing signals, comprising:

a central processing unit operable to process data and perform operational functions on data;

a configuration block which includes a plurality of destination registers;

a host data bus operable to facilitate communications within a computer system and to transfer data from one computer system component to another computer system component;

a post write buffer interposed between the host data bus and the configuration block such that any transfer of data to a particular one of the plurality of destination registers travels through the post write buffer, the post write buffer operable to transfer data from the host data bus to a particular one of the plurality of destination registers; and the post write buffer further operable to synchronize a first clock timing signal and a second clock timing signal if the host data bus and the particular one of the plurality of destination registers are controlled by different clock timing signals.

13. The system of claim 12, wherein the post write buffer includes an address decoder and for each of the plurality of bytes of data in the particular one of the plurality of destination registers, an address buffer, a data buffer, a first write enable circuit and a second write enable circuit.

14. The system of claim 12, wherein the post write buffer receives data from the host data bus in order to free the host data bus to perform other functions.

15. A method for transferring data in a host data bus to a destination register, comprising:

receiving a destination register address from a host data bus;

receiving data from the host data bus;

receiving a first clock timing signal and a second clock timing signal;

receiving a buffer write signal enabling a data transfer from the host data bus to a post write buffer in order to release the host data bus for additional data transfers;

decoding the destination register address to determine whether the first clock timing signal or the second clock timing signal controls the operating frequency of the destination register;

generating a clock select signal in response to the destination register address;

generating a write enable signal in response to the clock select signal and the buffer write signal; and transferring data from the post write buffer to the destination register in response to the write enable signal.

16. The method of claim 15, further comprising:

decoding the destination register address to determine a number of data bytes necessary to be received before performing a data transfer to the destination register;

generating a write pending signal until all necessary data bytes are available in the post write buffer; and holding data in the post write buffer until the write pending signal indicates all necessary bytes are in the post write buffer and ready for transfer to the destination register.

17. The method of claim 15, further comprising receiving a reset signal and resetting the post write buffer circuit elements to default values.

18. The method of claim 15, further comprising generating a write busy signal in response to data being present in the post write buffer which has not been transferred to the destination register.

19. The method of claim 16, wherein the step of generating a write enable signal further comprises evaluating the write pending signal to determine if the destination register requires more than one byte of data to be transferred.

* * * * *